United States Patent [19]
Cheng

[11] Patent Number: 5,991,171
[45] Date of Patent: Nov. 23, 1999

[54] DC-TO-DC CONVERTERS

[75] Inventor: Kim Tung Cheng, Kowloon, The Hong Kong Special Administrative Region of the People's Republic of China

[73] Assignee: PI Electronics (H.K.) Ltd., Kowloon, The Hong Kong Special Administrative Region of the People's Republic of China

[21] Appl. No.: 09/018,935

[22] Filed: Feb. 5, 1998

[51] Int. Cl.[6] .......................... H02M 3/335; H02M 5/42
[52] U.S. Cl. .................................. 363/21; 363/97
[58] Field of Search .................. 363/20, 21, 50, 363/55, 56, 95, 97, 131

[56] References Cited

U.S. PATENT DOCUMENTS

| | | | |
|---|---|---|---|
| 4,958,268 | 9/1990 | Nagata et al. | 363/16 |
| 5,519,599 | 5/1996 | Shinada et al. | 363/21 |
| 5,528,482 | 6/1996 | Rozman | 363/21 |
| 5,726,869 | 3/1998 | Yamashita et al. | 363/21 |
| 5,781,420 | 7/1998 | Xia et al. | 363/21 |

*Primary Examiner*—Matthew Nguyen
*Attorney, Agent, or Firm*—Leydig, Voit & Mayer, Ltd.

[57] ABSTRACT

A DC-to-DC converter is described that provides resonant-transition switching by ensuring that the voltage across a first switch falls to zero between cycles.

18 Claims, 10 Drawing Sheets

DC-TO-DC CONVERTERS

BACKGROUND OF THE INVENTION

1. Field of the Invention

The invention relates to DC-to-DC converters.

2. Description of Prior Art

In DC-to-DC conversion with isolation between input and output, conventional forward and flyback converters are commonly used in the industry. Single-ended flyback converters are dominant in the low-cost and low-power power supply applications because of their circuit simplicity. Furthermore, they are frequently used for wide-input-range power converters, for example an AC adaptor with universal input voltage range (90–240 VAC), because of their nonlinear output-input voltage conversion ratios (D/(1–D)). Synchronous rectifiers are used to improve power conversion efficiency, especially for low output voltage, such as described in U.S. Pat. No. 4,958,268 in a flyback converter.

Figure 13:
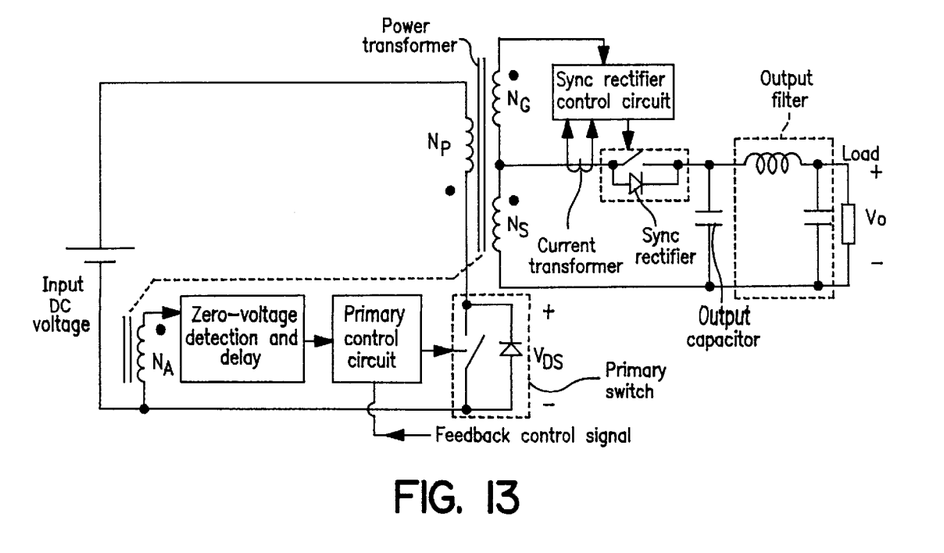
FIG. 13 is a circuit diagram of a resonant-transition switching flyback converter using synchronous rectifier described in U.S. Pat. No. 4,958,268.

U.S. Pat. No. 4,958,268 also discloses a special type of resonant-transition switching using the synchronous rectifier (FIG. 13). A reverse magnetizing current is produced by the reverse conduction of the synchronous rectifier before the primary switching means turns on. The parasitic capacitance across the primary switching means is discharged by the reverse magnetizing current, and thus the turn-on switching loss can be minimized. Small magnetizing inductance or large flux excursion of the flyback transformer is required to achieve this resonant-transition switching; higher core loss usually results. High RMS currents in both primary and secondary windings also cause high conduction loss in the flyback transformer. Moreover, a high ripple current flowing through the output capacitor causes high ripple voltage and spikes. An L-C output filter is usually required for such a special type of flyback converter.

SUMMARY OF THE INVENTION

It is an object of the invention to provide an improved DC-to-DC converter.

According to the invention there is provided a DC-to-DC converter comprising input terminals for receiving a DC supply, a power transformer having a primary winding, a first switch with an anti-parallel rectifier connected between one input terminal and the primary winding, output terminals arranged to supply DC output signals to a load, a coupling capacitor connected between the transformer and an output inductor connected to one output terminal, an output capacitor connected across the output terminals, a second switch connected between a junction between the coupling capacitor and the output inductor and the other output terminal, a first auxiliary transformer winding and a second auxiliary transformer winding, and a control circuit arranged to respond to signals generated in the auxiliary windings for controlling the first and second switches in a manner to provide resonant-transition switching of the converter.

The power transformer may have an isolated secondary winding and the coupling capacitor is connected to the secondary winding. A voltage clamp circuit may be connected across the primary winding.

The DC-to-DC converter may include a current sensor circuit for measuring current flowing in the second switch and supplying signals to the control circuit.

The control circuit is preferably arranged to control the first switch to turn ON only after the voltage across the first switch has fallen to zero volts in each cycle.

The control circuit may be arranged to switch the converter ON for a same predetermined time interval in each cycle.

The control circuit may be arranged to switch the converter to provide a predetermined power at the output terminals, the frequency of switching being increased with decreased load.

Preferably, each of the first and second switches comprise a MOSFET, the anti-parallel rectifier comprising a body diode of the MOSFET.

The converter may have a first and/or a second auxiliary inductor respectively connected across the secondary and/or primary winding respectively in which the energy stored in the said coupling capacitor and/or output is released back to the appropriate auxiliary winding or windings.

The invention also provides a DC-to-DC converter comprising input terminals for receiving a DC supply, a power transformer having a primary winding, a first switch with an anti-parallel rectifier connected between one input terminal of the converter and the primary winding of the said power transformer, output terminals arranged to supply DC output signals to a load, a coupling capacitor connected between a secondary winding of the said power transformer and an output inductor connected to one output terminal of the converter, a second switch with an anti-parallel rectifier connected across a junction between the coupling capacitor and the output inductor and the other output terminal of the converter, in which the coupling capacitor comprises of a capacitor having dominant capacitive reactance (Xc dominant) and low loss (high Q factor) characteristics.

The invention may provide a DC-to-DC converter comprising input terminals for receiving a DC supply, a power transformer having a primary winding, a first switch with an anti-parallel rectifier connected between one input terminal of the converter and the primary winding of the said power transformer, output terminals arranged to supply DC output signals to a load, a coupling capacitor connected between the secondary winding of the said power transformer and an output inductor connected to one output terminal of the converter, including a third output terminal to provide a low voltage output to the load via a second inductor magnetically coupled to the output inductor, and a synchronous rectifier connected to the second inductor to provide reverse current for resonant-transition switching of the first switch.

BRIEF DESCRIPTION OF THE DRAWINGS

DC-to-DC converters according to the invention will now be described by way of example with reference to the accompanying drawings in which.

DESCRIPTION OF PREFERRED EMBODIMENTS

Figure 1:
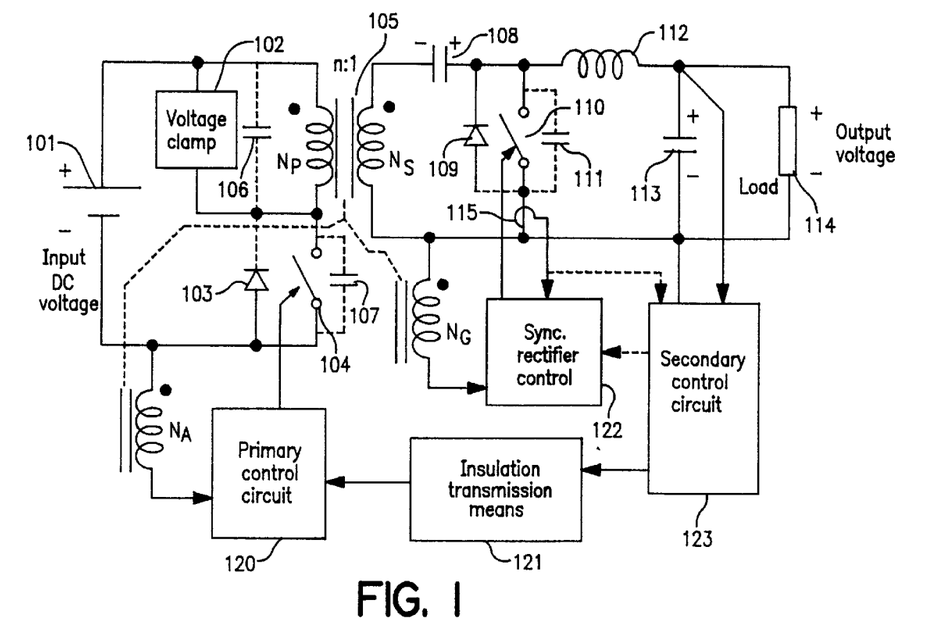
FIG. 1 is a circuit diagram of one DC-to-DC switching power supply according to the invention.

A basic circuit arrangement of a Forward-Flyback-Buck (FFB) converter with synchronous rectifier is shown in FIG. 1. A primary side of the power conversion stage consists of an input DC voltage (101), a primary switching means (104) in parallel with an anti-parallel rectifier (103), a primary winding ($N_p$) of a power transformer (105) and a voltage clamp (102). An input DC voltage may be a direct input DC source or a rectified DC voltage obtained from an AC source. The primary switching means preferably comprises a MOSFET. The anti-parallel rectifier will then be the body diode of the MOSFET. Capacitors (106) and (107) represent parasitic capacitances of the primary switching means and the transformer reflected to the primary side, respectively. From an AC point of view, the two parasitic capacitances can be effectively lumped as one.

The voltage clamp is used to limit the maximum voltage across the primary switching means during a release period of the energy stored in the leakage inductances of the transformer. It may be implemented by a conventional RCD clamp, active clamp or other clamp circuits, acting dissipatively or non-dissipatively.

The energy from the input is transferred to the secondary side of the transformer. The turns ratio of the transformer ($N_p/N_s$) is denoted as n:1. The dots on the primary and secondary windings refer to their respective polarities. The transformer (105) operates in both forward and flyback modes, i.e. energy is transferred from the primary side to the secondary side for both polarities of the winding voltage.

The secondary side of the power conversion stage consists of a coupling capacitor (108), a second switching means (110) in parallel with an anti-parallel rectifier (109), an output inductor (112), an output capacitor (113) and a load (114). The second switching means is preferably implemented with a MOSFET and acts as a "synchronous rectifier". The anti-parallel rectifier is the body diode of the MOSFET. A capacitor (111) is a parasitic capacitance of the second switching means.

The output may be the voltage across the load or the current through the load or other specific combination of voltage and current. For example, some AC adaptors may require three output modes, constant voltage (CV), constant current (CC) and constant power (CP).

To achieve resonant-transition switching, the control methods and the operating modes of the FFB converter are crucial. "Resonant-transition switching" refers to a complete or partial discharge of the primary parasitic capacitance so that the primary switching means is turned on at a voltage significantly below its flat-top voltage (which is the voltage reflected from the secondary side plus the input voltage). In this way, the turn-on switching loss as well as the switching noise are reduced. In technical terms commonly used in the literature of switching power conversion, a complete resonant-transition switching corresponds to Zero-Voltage Switching (ZVS); the advantage per se of ZVS is well established in the art.

Details of the circuit operation and control mechanism of the FFB converter are described below, but firstly functions of the control blocks in FIG. 1 are briefly described. The primary control circuit (120) controls the turn-on instant and the on-period (and the turn-off instant) of the primary switching means. The turn-on instant is triggered by the signal of an auxiliary winding ($N_A$). The on-period is determined either by the output signal of the insulation transmission means (121) or by an internal timer of the primary control circuit. The voltage of the auxiliary winding is coupled from the power transformer. The dot refers to its polarity with respect to the primary winding in the normal manner.

On the secondary side, a secondary control circuit (123) is responsible for the regulation of the output. In FIG. 1, it regulates the output voltage. Error signals produced by the secondary control circuit are either fed back to the primary control circuit through the insulation transmission means (e.g., through an optocoupler) to adjust the on-period of the primary switching means or fed directly into a synchronous rectifier control (122) to adjust the on-period of the second switching means; this depends on the operating modes and control method of this Forward-Flyback-Buck (FFB) converter. The dotted arrow connecting the secondary control circuit to the synchronous rectifier control refers to the latter alternative control scheme. In this alternative, no insulation transmission means is required.

Similar to the primary control circuit, a synchronous rectifier control (122) controls the turn-on instant and the on-period (and the turn-off instant) of the second switching means. The turn-on instant is triggered by the signal of a gate winding ($N_G$), which is coupled from the transformer. The on-period is determined either by the reverse current level of the synchronous rectifier detected by a current sensor (115) or by an error signal produced by the secondary control circuit. The current sensor may be a current transformer or a low-ohm resistor with a high-gain amplifier. In the latter alternative, no current sensor is needed.

A signal representing the output current may be derived from the current sensor for effecting output control. The dotted arrow connecting the current sensor to the secondary control circuit refers to this application.

Figure 2:
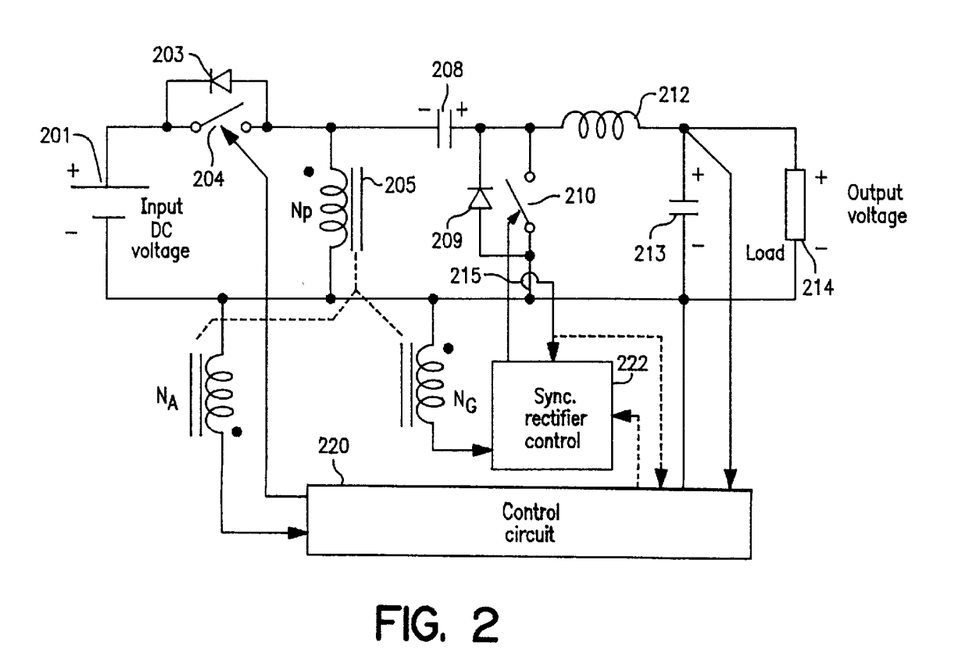
FIG. 2 shows a non-isolated circuit arrangement of FIG. 1.

FIG. 2 shows the non-isolated version of the FFB converter in FIG. 1. The power transformer is comprised by a flyback inductor (205). It does not require a voltage clamp because no leakage inductances exist in this case. The primary and secondary control circuits are combined into a single control circuit (220) as no isolation is needed. Besides the isolation, the operation of the circuit arrangement in FIG. 2 is same as FIG. 1.

The electrical characteristics of the FFB converter are summarized as follows. It can be shown that the input-output voltage conversion ratio in continuous conduction mode (ccm) is $$V_O = \frac{V_{CC}}{n} \frac{D}{1-D}$$

where $V_o$=output voltage $V_{cc}$=input voltage n=turns ratio of the transformer D=duty cycle The above result assumes ideal components and is exactly same as that of a flyback converter.

It is also important to consider the voltage and current stresses of the coupling capacitor and the power semiconductors. It can be shown that the flyback voltage ($V_C$) across the coupling capacitor is equal to the output voltage and the voltage and current stresses of the primary and second switching means are same as those of flyback converter. The two major control methods of the FFB converter with synchronous rectifier that can achieve resonant-transition switching are now described in detail:

(A) Constant On-Time Operation

Figure 3:
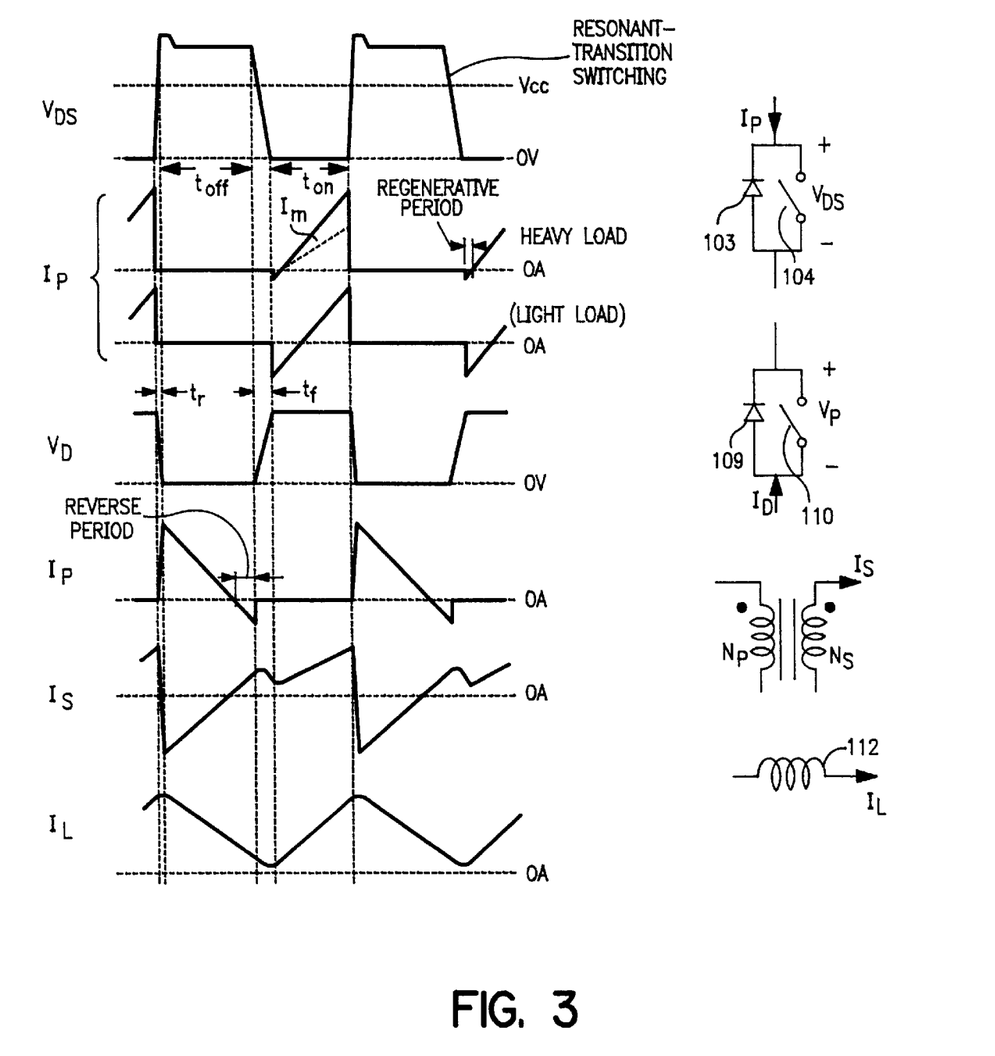
FIGS. 3 to 5 are key waveform diagrams showing the operation of the circuit arrangement of FIG. 1.

The operation of the FFB converter in this mode will be described with the switching waveforms shown in FIG. 3. For simplicity, we assume that all components are ideal and that the converter reaches steady state. Let us start a switching cycle at the turn-on of the primary switching means. As the primary and second switching means are switched alternately, the second switching means is turned off at this moment. This period is referred as the on-period ($t_{on}$) depicted in FIG. 3. Heavy load condition is considered first. The primary current ($I_p$) rises linearly due to two current components, the magnetizing current of the transformer ($I_m$) and the output inductor current ($I_L$) reflected to the primary side through the transformer. When the turn-on time reaches a pre-determined value set by the primary control circuit (i.e. constant on-time), the primary switching means is turned off. The voltage across the primary switching means ($V_{DS}$) begins to rise until it reaches the voltage level set by the voltage clamp. This short time interval is referred as the rise time ($t_r$). The leakage energy stored in the transformer is then released to the voltage clamp. In the same time interval of $t_r$, the voltage across the secondary winding of the transformer begins to fall and swings negative. The parasitic capacitance (111) of the synchronous rectifier is also discharged. Eventually, this voltage equals the coupling capacitor voltage and the rectifier (109) conducts. Assume that the capacitance of the coupling capacitor is large enough to keep the capacitor voltage, the flyback voltage ($V_C$), constant, then the second switching means (110) is turned on by the synchronous rectifier control circuit. Both the magnetizing current of the transformer (into the dot of the secondary winding) and the output inductor current pass through the synchronous rectifier (109 and 110). This period is referred as the off-period ($t_{off}$) shown in FIG. 3.

For AC adaptor with universal input voltage range, the magnetizing current is usually larger than the output inductor current at this commutation time ($t_r$). A larger portion of the total magnetic energy is stored in the power transformer than in the output inductor.

Equivalently, the output inductance is larger than the secondary inductance of the transformer. This is to minimize the number of turns of transformer windings and hence the leakage inductances, as well as the total amount of stored magnetic energy per cycle. As a result, the size of magnetic components are minimized and the conversion efficiency is maximized.

During the off-period, the energy stored in the power transformer and the output inductor is released to the coupling capacitor and the output capacitor, respectively. The load takes the average power from the output capacitor throughout the whole cycle. Both the magnetizing current and the output inductor current decrease during the off-period until the current flowing through the synchronous rectifier ($I_D$) becomes negative. Then the second switching means is turned off at the end of the off-period $t_{off}$. The on-time of the second switching means (i.e. $t_{off}$) is controlled by an error signal produced by the secondary control circuit and is transmitted to the synchronous rectifier control circuit through the dotted arrow connecting the two associated blocks in FIG. 1. The time interval that the current flowing through the synchronous rectifier is negative is referred to as the reverse period.

Following the turn-off of the second switching means, the negative $I_D$ discharges the primary parasitic capacitances and the voltage $V_{DS}$ swings down toward zero. If the magnitude of the negative $I_D$ is sufficiently large, $V_{DS}$ will eventually reach zero and the anti-parallel rectifier (103) is turned on. Then the primary switching means is turned on at zero voltage and a new switching cycle starts. Note that a negative primary current peak is observed in the so-called regenerative period shown in FIG. 3. The time interval that the resonant-transition switching takes place is referred as the fall time $t_f$.

It is noted that a small current dip occurs in this short period ($t_f$). It is due to the unification of both currents flowing in the secondary winding of the transformer and the output inductor when the two inductances are effectively in series during $t_f$. As mentioned above, the output inductance is usually larger than the secondary inductance of the transformer. The secondary current will be more positive than the output inductor current. Due to the existence of leakage inductances, the secondary current has to keep flowing and charges the output inductor current before it finally decreases to the same current level of the output inductor. Then the two inductances combine in parallel to behave as a single inductance for the remaining part of $t_f$ and the whole on-period. Their inductance ratio determines their current sharing.

During the fall time $t_f$, the primary control circuit senses the zero crossing point of the transformer voltage and introduces some time delay to turn on the primary control means at the lowest voltage for both complete and partial ZVS.

In the constant-on time operation, the negative $I_D$ is essential to the resonant-transition switching and the proper operation of the FFB converter. The inductances of the transformer and the output inductor are designed to fulfil this requirement for all load and line conditions. As the output voltage is regulated through the on-time control of the second switching means, no insulation transmission means is needed.

As the duty cycle depends only on the input and output voltages in ccm, it remains the same for a fixed input and output voltages. In FIG. 3, it also shows the case of light load ($I_p$ only). All current waveforms are shifted downward to account for the lower output current and all voltage waveforms are almost the same. The total current excursion however remains unchanged. More reverse current of $I_D$ is available for resonant-transition switching as the load current decreases. The rise and fall times also decrease at light load.

For the constant on-time operation, the switching frequency decreases as the input voltage increases. It is because the off-time increases with the input voltage in order to regulate the output voltage. More reverse current of $I_D$ results at high line.

It is a disadvantage of this control method to have large reverse current flowing back from the output to input at high line and light load. This problem may be partially solved by a feedforward control of the on-time inversely proportional to the input voltage.

A possible drawback of this control method is the foolproof ability of its switching operation. The availability of negative $I_D$ for the turn-on of the primary switching means is not inherently guaranteed by this control method. It relies on the fast action of the control and protection circuits.

(B) Boundary-Mode Operation

This kind of operation mode is known in conventional flyback converters and is generally referred as self-oscillating flyback converter or blocking oscillator. Its operation is generally more reliable and efficient than that of constant on-time.

Figure 4:
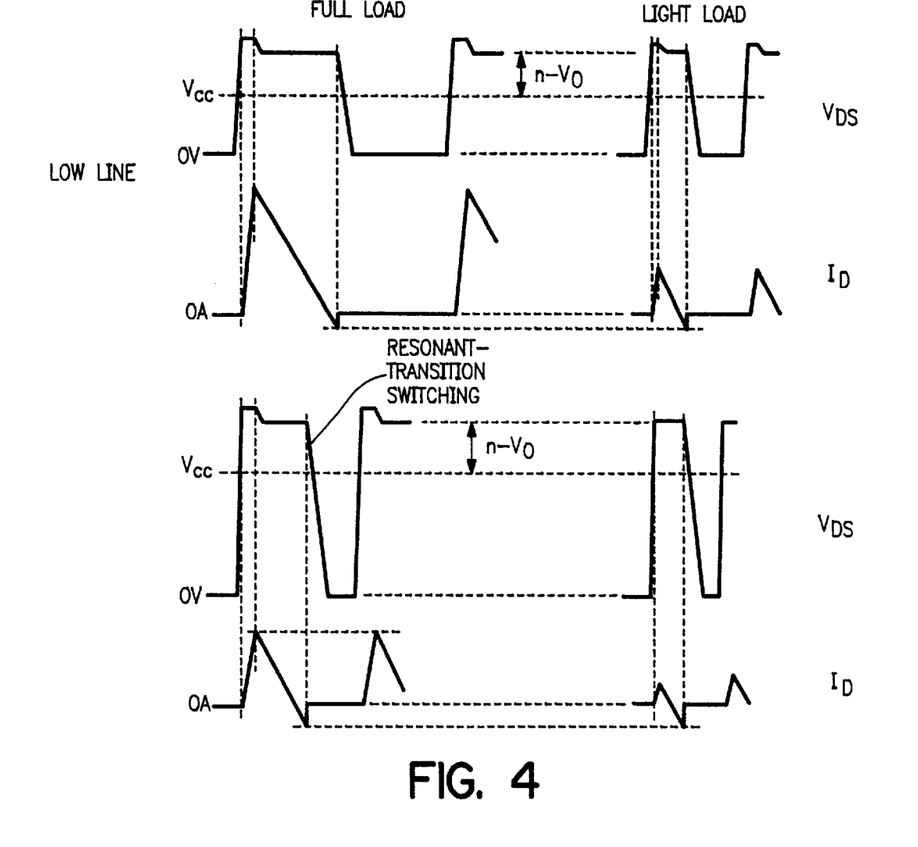

FIG. 4 shows the major switching waveforms of boundary-mode operation for FFB converter. Only $V_{DS}$ and $I_D$ are sufficient to illustrate the switching operation under the four extreme line and load conditions. Other voltage and current switching waveforms are essentially the same as those in FIG. 3, except some variations in magnitude and timing according to the line and load conditions. The operation of this control method is similar to that of constant on-time operation except the following:

1. At the end of the on-period, the primary switching means is turned off when the primary current reaches a pre-determined level set by the secondary control circuit through the insulation transmission means (i.e. current mode control).

2. At the end of the off-period, the second switching means is turned off when the current flowing through the synchronous rectifier ($I_D$) reaches a pre-determined negative level inherently set by its control circuit. As a result, a negative $I_D$ is certainly available for resonant-transition switching and the turn-on of the primary switching means.

Note that the default mode of operation of the circuit arrangement in FIGS. 1 and 2 is the boundary mode.

In FIG. 4, consider the low line condition first. The negative current peak of $I_D$ is kept constant for all load conditions. The switching frequency increases from full load to light load. This is identical to the case of self-oscillating flyback converter. Note that the input-output voltage conversion ratio of the FFB converter shown above can also be applied to the boundary mode.

For high line, the negative current peak of $I_D$ is also kept constant for all load conditions. However, it is advantageous to increase the negative current peak by a sufficient amount so that more reverse current is available for resonant-transition switching. The primary switching means can then be turned on at a lower voltage.

The switching frequency increases as the input voltage for the boundary mode of operation. The highest switching frequency occurs at maximum input and output voltages and minimum load current while the lowest occurs at minimum input and output voltages and full load.

Besides the above two major operating modes, there exist various control schemes and operating modes that can achieve resonant-transition switching in the FFB converter with synchronous rectifier. The synchronous rectifier in fact introduces one more control freedom for resonant-transition switching.

In general, the FFB converter with synchronous rectifier can achieve resonant-transition switching with the following generic switching operation:

1. The primary and second switching means are switched alternately, with two relatively short transition periods in between ($t_r$ and $t_f$).

2. The second switching means is controlled so that a reverse current flowing through the synchronous rectifier is available at the turn-off of the second switching means for the subsequent resonant-transition switching.

3. The primary switching means is controlled to turn on at or close to the lowest voltage across it.

Different control methods assert control of various parameters (e.g. off-time, frequency, duty cycle, etc) for the purpose of output regulation and resonant-transition switching.

The advantages of resonant-transition switching FFB converter are now summarized before circuit variations are investigated:

The flyback energy transfer mechanism in the FFB converter is limited around the loop of the secondary transformer winding. The output capacitor is isolated from this high ripple current and voltage loop by the synchronous rectifier and the output inductor. It is significant in embodiments of this invention to steer high ripple current and voltage from the output inductor to the coupling capacitor.

Conventionally, the output capacitor is an electrolytic type because of the output ripple voltage requirement and converter stability. As the impedance of an electrolytic capacitor is ESR dominant in most practical cases, a plurality of such type of capacitors are usually connected in parallel to reduce the ripple current and voltage. Due to space and cost limitations, the number of electrolytic capacitors that can be connected in parallel may not be sufficient to keep the power loss in the output capacitor below 1% in most practical flyback converters, especially for low output voltage. Electrolytic capacitor are still used as the output capacitor in the FFB converter because of their large capacitance for converter stability. Due to the existence of the output inductor, the ripple current of the output capacitor is highly reduced when it is compared with a flyback converter. A single electrolytic capacitor is usually sufficient for the output capacitor of the FFB converter.

It can be shown that no significant advantage in efficiency can be gained if electrolytic capacitors are used as the coupling capacitor in the FFB converter. It is because the same number and type of electrolytic capacitors are needed for the same ripple current flowing in each capacitor in both cases of FFB and flyback converters. In fact, FFB and flyback converters have many common electrical characteristics. But in this FFB converter, one can take the advantage of steering the ripple voltage from the output capacitor to the coupling capacitor. Low-loss polymer film capacitors (e.g. polyester, polycarbonate, polypropylene, etc) are very suitable for the coupling capacitor. The impedance of a polymer film capacitor is capacitive reactance (Xc) dominant in most cases. It is well known that the Q-factor of polymer film capacitor is much higher than that of an electrolytic capacitor. It means that its ESR is extremely low. Only ESR will cause power loss in reactive components. Therefore, low power loss and high ripple voltage results in the coupling capacitor if polymer film capacitor is used. This does not affect the proper operation of the FFB converter as far as the resonant frequency ($f_c$) of the secondary inductance of the transformer and the coupling capacitor is not close to the switching frequency. As a practical rule, the resonant frequency $f_c$ should be less than $1/(4t_{off})$.

With the present capacitor technology, the available capacitance of 35V polyester metallized film capacitor is in the range of 2.2 $\mu$F to 22 $\mu$F. It serves for the application of 60 W 15–19V AC adaptor. Better capacitors (e.g. larger capacitance with lower rated voltage, lower loss) are expected to become available in the future as capacitor technology advances.

Figure 5:
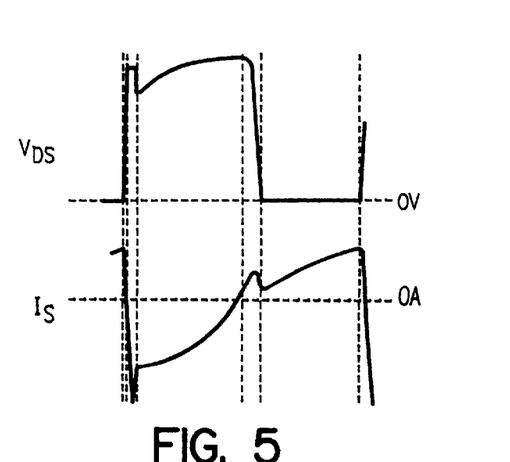

FIG. 5 shows the practical switching waveforms of $V_{DS}$ and $I_S$ using $X_c$-dominant capacitor as the coupling capacitor. Small amount of "low-frequency" resonant effect appears on the flat-top waveform of $V_{DS}$ and the two linear current segments of the secondary transformer current. It is noted that the coupling capacitor resonates with the output inductor during the off-period.

The leakage inductance of the transformer is also taken into account in FIG. 5. The leading voltage and current spikes of $V_{DS}$ and $I_s$, respectively, are produced by the leakage inductances. It is optimum to have both the voltage spikes due to leakage inductance and the resonant top of $V_{DS}$ peaking at approximately the same voltage level.

The above particular combination of capacitor types in FFB converter will reduce the total power loss of the converter by 1% or more, as well as the total volume of capacitors required.

The second advantage of resonant-transition switching FFB converter is contributed by the distributed energy storage in both output inductor and power transformer. For the same amount of energy stored per cycle, an inductor is more efficient than a transformer because leakage inductance does not exist and skin and proximity effects caused by two alternately switching windings are significantly reduced. Moreover, the clearance and creepage constraints imposed by safety regulations do not apply to an inductor. Therefore, if part of the total energy can be stored in the output inductor, the total volume of magnetic components will be reduced. The power transformer can be better optimized for lower power loss and leakage inductance because it operates in both forward and flyback modes and is required to store less energy per cycle than a single flyback transformer. With an optimum ratio between the secondary inductance of the transformer and the output inductor, the above arrangement of two magnetic storage devices in the FFB converter can further increase the conversion efficiency by 1 to 2%, or more.

The third advantage of this resonant-transition switching FFB converter is its similarity in electrical characteristics to a resonant-transition switching flyback converter. The non-linear input-output voltage conversion ratio allows both converter types to cope with a very wide input voltage range required by an AC adaptor. All existing control schemes used in such a special type of flyback converter can be directly implemented in the FFB converter.

The following practical issues are noted:

A low-drop rectifier (e.g. Schottky diode) may be connected across the series combination of the synchronous rectifier (109 and 110) and the current sensor (115) in order to conduct high current spikes at each turn-on of the synchronous rectifier and hence reduce the power loss during these transition periods.

For an AC adaptor, the optimum switching frequency range is from 50 kHz to 200 kHz. The switching frequency may however be pushed to a higher range for a power supply with a lower input voltage range (e.g. 36 to 72 VDC).

Using the principle of separating energy storage and energy transfer functions of a power transformer as described above, the power transformer (105) can be further modified to comprise a pure transformer in parallel with a separate inductor on either primary or secondary side. It is also possible to have two separate inductors connected on both primary and secondary sides. The pure transformer does not require air gaps for energy storage, thus its magnetizing inductance is high, which are only for energy transfer between primary and secondary. The separate inductor is used for energy storage and has appropriate inductance so that the terminal characteristics of the combination is same as the power transformer (105) for the required circuit operation of the circuit arrangement in FIG. 1.

Despite of a possible increase of copper volume, this special arrangement of a pure transformer and a separate inductor has the following advantages. First, the transformer now requires less turns. Leakage inductances and hence the associated power loss will be decreased. Also, the transformer size and profile height are reduced. This arrangement of separated magnetics is particularly useful in applications where profile limit is very stringent and flat magnetic devices are needed (e.g. in high-density DC-to-DC power modules). Also, with this arrangement, both the pure transformer and the separate inductor can be further optimized for lower power loss because of less constraints imposed on their design.

The combination of the separate inductor connected in parallel with the secondary winding of the transformer will provide a better conversion efficiency amongst all combinations. It is because the major power flow in the transformer is uni-directional (from primary to secondary side) and the energy stored in the separate inductor is directly transferred to the coupling capacitor during flyback period.

The control signals produced by the auxiliary and gate windings ($N_A$ and $N_G$) in FIGS. 1 and 2 may be coupled from the output inductor instead of the power transformer, with appropriate polarities. It is also possible to couple the auxiliary winding signal from the transformer and the gate winding signal from the output inductor based on the consideration of isolation. But it is better to couple the gate winding signals from the power transformer for faster turn-on of the synchronous rectifier. Due to the existence of parasitic inductance and resistance along the connection path of the secondary transformer winding, the coupling capacitor and the output inductor, the gate winding signals coupled from the transformer always rise earlier and sharper than that from the output inductor.

In order to further reduce the output ripple voltage, an L-C filter may be inserted between the output capacitor and the load. In the case of FFB converter, the triangular ripple voltage is much easier to filter than the inverted sawtooth ripple in a flyback converter.

Figure 11:
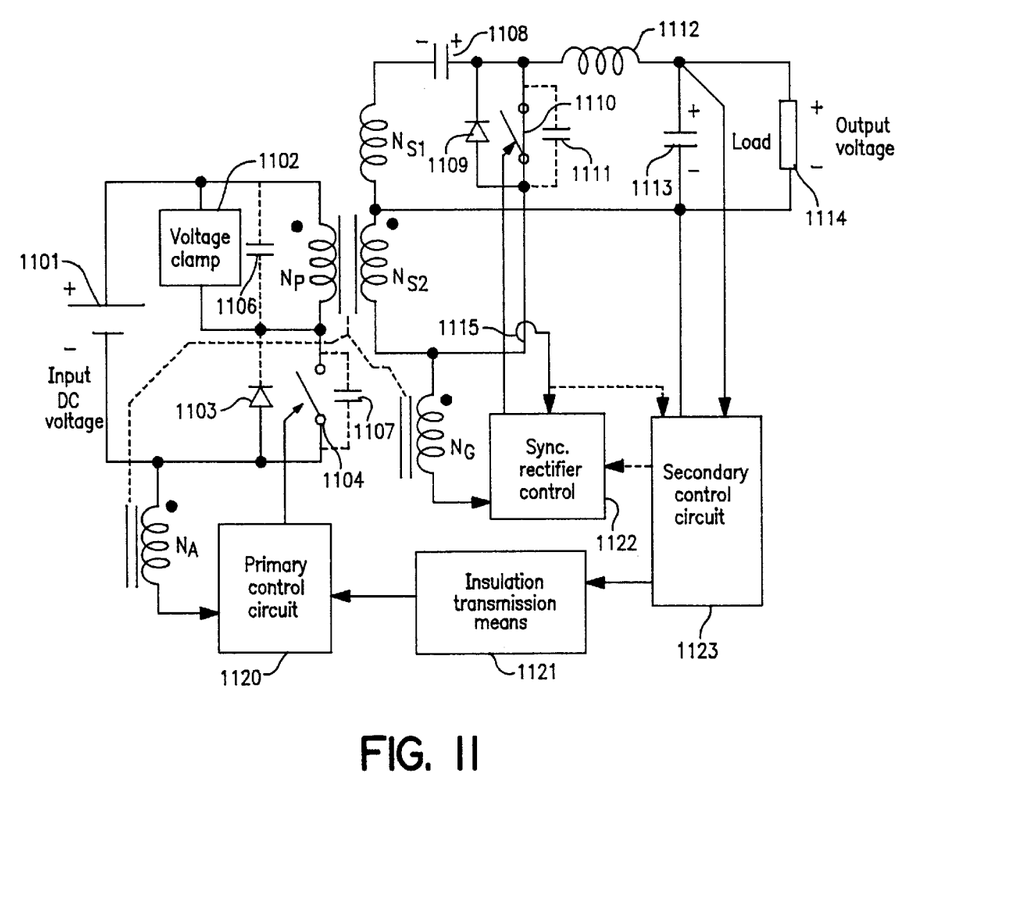
FIG. 11 is a circuit diagram of a variation of the circuit arrangement of FIG. 1 with tapped transformer secondary windings.
Figure 12:
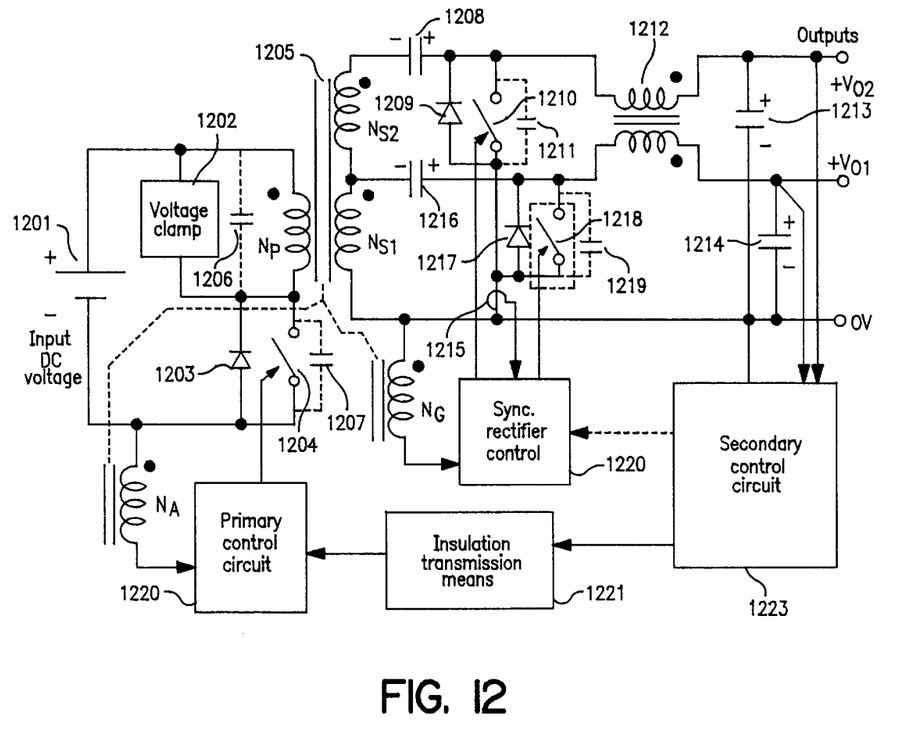
FIG. 12 is a circuit diagram of a variation of the circuit arrangement of FIG. 1 with multiple outputs and coupled inductors.

Alternative circuit arrangement are now described with reference to the Figures, FFB converter with clamp switch (FIG. 6), FFB converter with tapped inductor (FIG. 9), FFB converter with tapped transformer secondary winding (FIG. 11), and FFB converter with multiple outputs and coupled inductors (FIG. 12).

Figure 6:
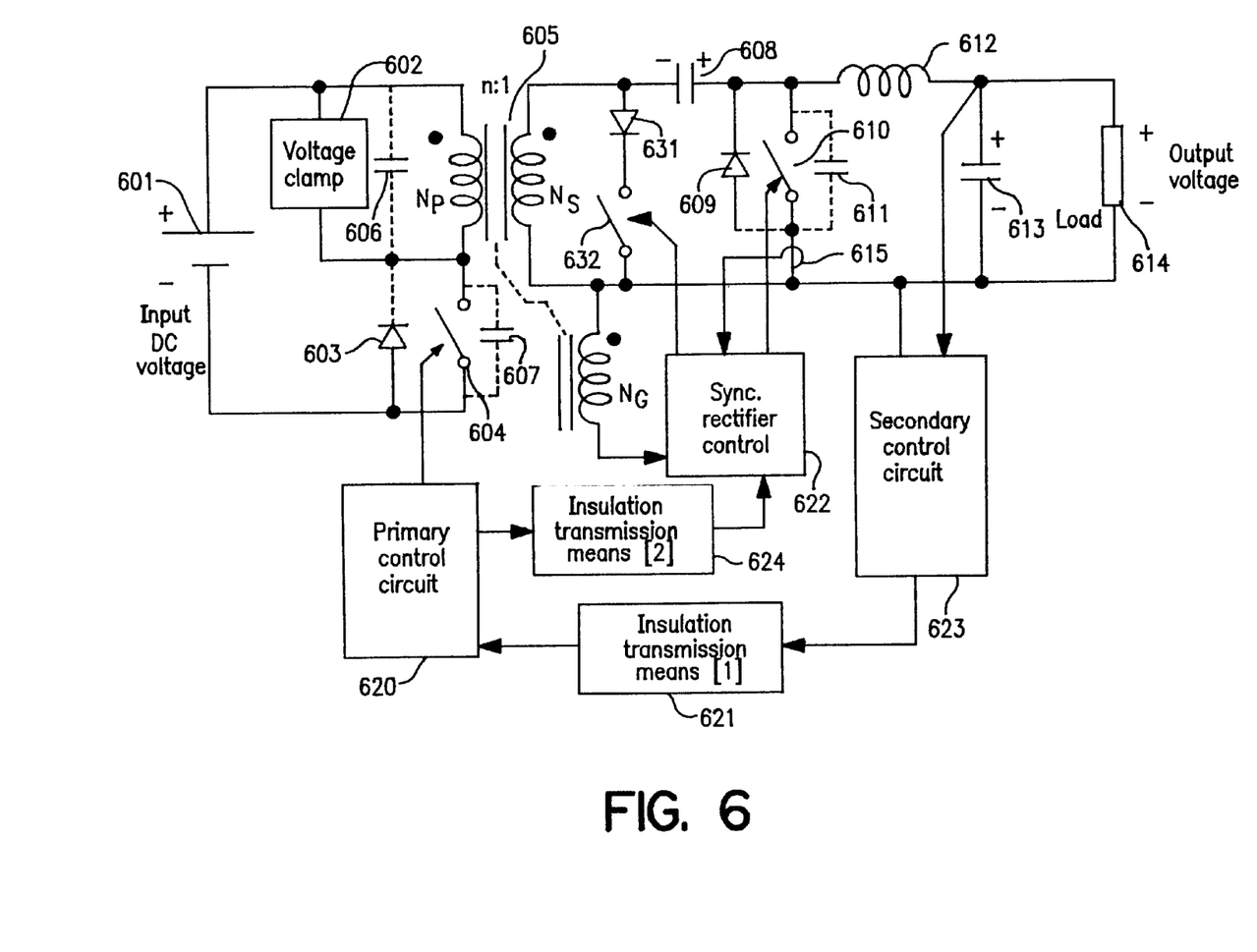
FIG. 6 is a circuit diagram of another DC-to-DC switching power supply according to the invention.
Figure 6A:
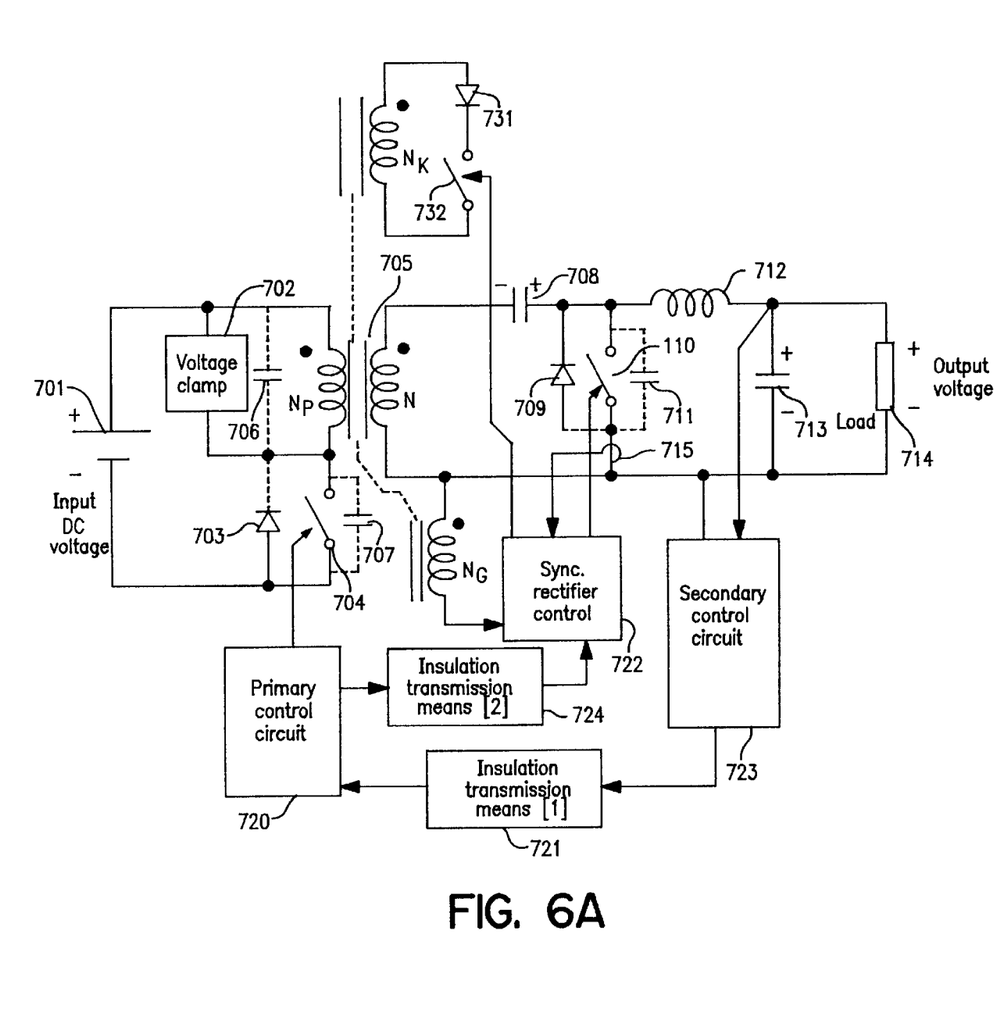
FIG. 6A is a circuit diagram of a modification of the circuit of FIG. 6.

Referring to FIG. 6, it is known in fixed-frequency flyback converters that some parasitic oscillation caused by the resonance of the primary inductance of the flyback transformer and its associated parasitic, capacitance exists in discontinuous conduction mode (dcm). This parasitic oscillation may lead to unstable operation of the converter. U.S. Pat. No. 4,926,304 disclosed a low-loss interruption of such a parasitic oscillation using a clamp switch connected across the flyback transformer winding. In one of the present circuit arrangements, not only is the associated instability removed, but also resonant-transition switching is possible at all line and load conditions in dcm. The turn-on switching loss can then be minimized.

Comparing the circuits of FIGS. 1 and 6:

1. A clamp switch (632) and a series rectifier (631) are introduced across the secondary winding of the transformer (605).

2. The primary control circuit (620) does not require a signal generated by the transformer to determine the turn-on of the primary switching means (604). A built-in timer circuit and pulse width modulator control the on duration and switching frequency of the primary switching means. The control signal of the primary control circuit is fed back from the secondary control circuit through the first insulation transmission means (621).

3. The second switching means (610) is turned off either by a reverse current flowing through itself or by the turn-off signal transmitted from the primary control circuit through the second insulation transmission means (624).

4. The clamp switch is turned on synchronously to the second switching means and off by the turn-off signal transmitted from the primary circuit.

Considering the FFB converter operating in both ccm and dcm:

In ccm, the current flowing through the synchronous rectifier ($I_D$) is never zero or negative at its turn-off. The definitions of ccm and dcm in FIG. 6 are more complicated than the case with a simple output rectifier. As a result, the second switching means is always turned off by the off signal from the primary control circuit. The synchronous rectifier simply behaves as a diode with lower forward on-voltage. To avoid cross conduction between the input and output, a small time gap is required between the turn-off of the second switching means and the turn-on of the primary switching means.

As no reverse current of $I_D$ is available in this operating mode, the primary switching means is turned on at "hard switching". This may not be a severe problem because the converter can be designed to operate in ccm only at low line and heavy load. The turn-on switching loss becomes insignificant to the total power loss of the FFB converter.

Figure 7:
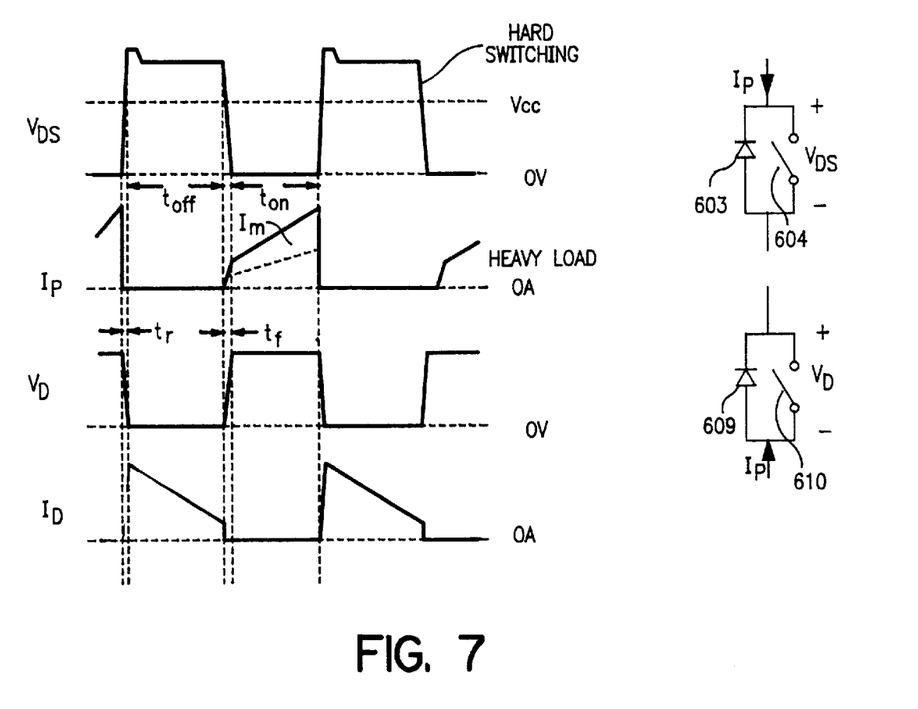
FIGS. 7 and 8 are key waveform diagrams showing the operation of the circuit arrangement of FIG. 6.

FIG. 7 shows the switching waveforms to illustrate the operation of FFB converter with clamp switch in ccm. In this operating mode, no current flows through the clamp switch at all because the rectifier (631) only allows reverse current of $I_D$ to flow through during $t_{off}$.

For light load and/or high line, the FFB converter depicted in FIG. 6 operates in dcm. It is important to select the inductances of both the transformer and the output inductor for the FFB converter with clamp switch to enter dcm at high line. The inductance values should be on the light side.

Figure 8:
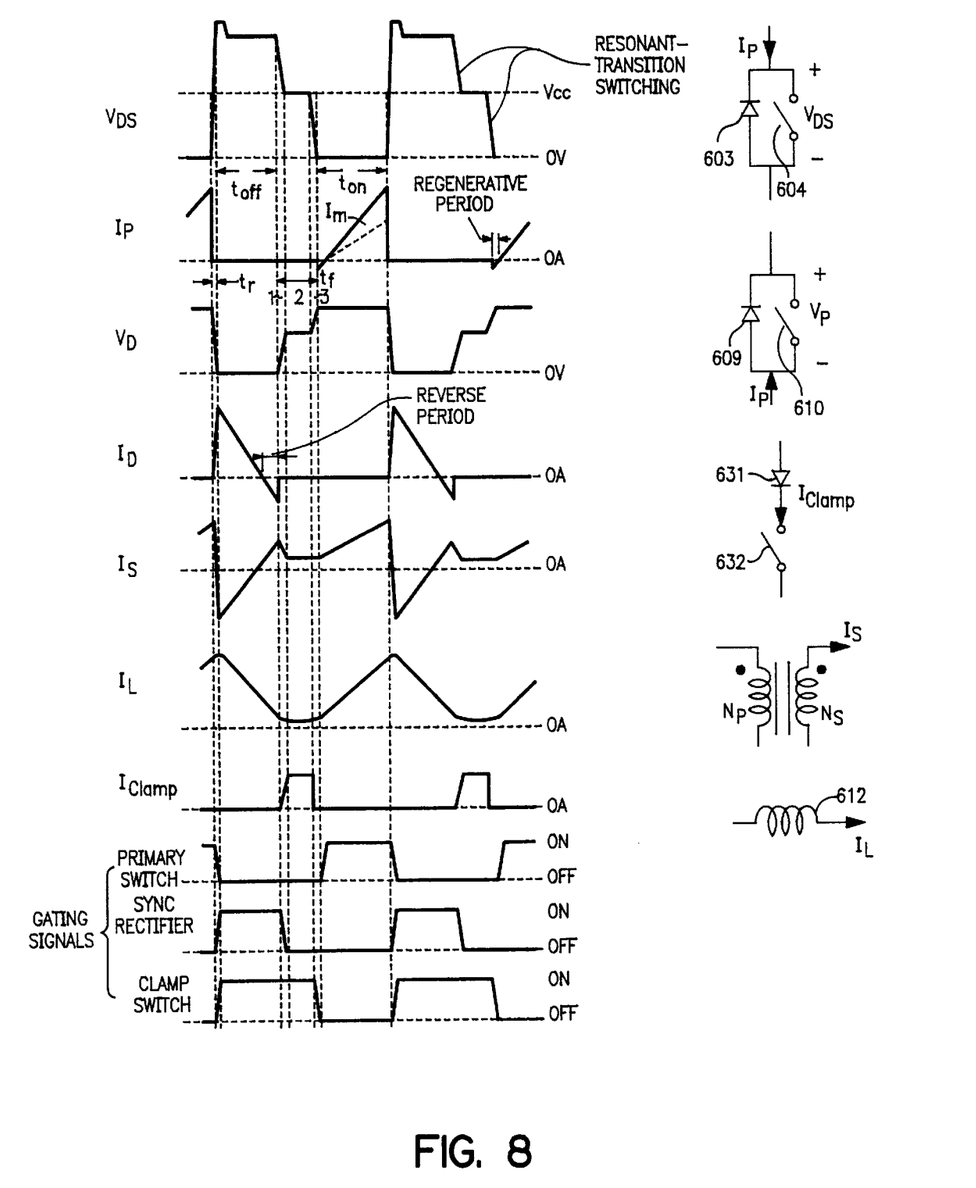

FIG. 8 depicts the switching waveforms of the FFB converter with clamp switch operating in dcm. FIG. 8 differs from FIG. 3 mainly in the fall time period ($t_f$). It can be further divided into three time segments, namely $t_{f1}$, $t_{f2}$ and $t_{f3}$. When the synchronous rectifier current $I_D$ becomes negative, the second switching means is turned off and the off-period ends. The reverse current of $I_D$ will then discharge the parasitic capacitances on the primary side and the voltage across the primary switching means ($V_{DS}$) falls. Although the clamp switch is turned on at the beginning of the off-period, it does not conduct any current because a series rectifier (631) is reverse biased during the flyback period ($t_{off}$). When the secondary voltage of the transformer swings from negative to slightly positive during $t_{f1}$, both the series rectifier and the clamp switch conduct the reverse current of $I_D$. The transformer voltage is then clamped at zero and a voltage step is formed in the waveform of $V_{DS}$. At the same time, both the magnetizing current of the transformer and the output inductor current are held constant.

The series combination of the series rectifier (631) and the clamp switch (632) shown in FIG. 6 may be alternatively connected across the output inductor (612) with polarity the same as the secondary winding ($N_S$). Such an arrangement will produce the same effect as in FIG. 6.

The duration of the clamp period ($t_{f2}$) is controlled by the timer circuit of the primary control circuit. At the end of the clamp period, the primary control circuit transmits a signal to turn off the clamp switch and the reverse current of $I_D$ is released to continue to discharge the parasitic capacitances on the primary side. The second stage of resonant-transition switching takes place.

After a predetermined time delay, the primary switching means is turned on and the on-period starts. If sufficient reverse current of $I_D$ is available, an anti-parallel diode (603) will be turned on before the turn-on of the primary switching means. In this case, the FFB converter achieves complete ZVS.

The FFB converter with clamp switch is mainly applicable for applications that require fixed frequency operation and resonant-transition switching at high line. Without resonant-transition switching, the turn-on switching loss is significant at high line and usually constitutes 1 to 2% of the total power loss of a switching converter.

The circuit arrangement in FIG. 6 avoids large reverse current flowing from the output to the input, which can deteriorate the conversion efficiency significantly. It is the purpose of the clamp switch to keep a relatively small and constant reverse current for resonant-transition switching; the clamp switch is required to conduct this relatively small current over the clamp period.

As mentioned above, a low-loss polymer film capacitor is also applicable in the FFB converter with clamp switch. Due to the relatively small capacitance of the coupling capacitor, the converter exhibits instability in ccm. This instability cannot be understood using linear feedback control theory because it is caused by the non-negligible resonance between the coupling capacitor and its two adjacent inductances. Conventional current mode control and slope compensation cannot suppress such an instability in most cases. Nonlinear current mode control or nonlinear slope compensation should be used. Both methods generate a signal of exponential rise type at the current sense input of a current mode controller.

The series combination of the rectifier (731) and the clamp switch (732) may be connected across a separate transformer winding ($N_K$) as depicted in FIG. 7. The clamping effect of FIG. 7 is same as that in FIG. 6. An advantage of such an arrangement is that a tradeoff between the voltage stress of the clamp switch and the turns ratio of $N_K/N_P$ is possible.

The circuit arrangements in FIGS. 1 and 6 represent the two major classes of resonant-transition switching FFB converter. Variations in resonant-transition switching FFB converters may be equally applied to both classes.

Figure 9:
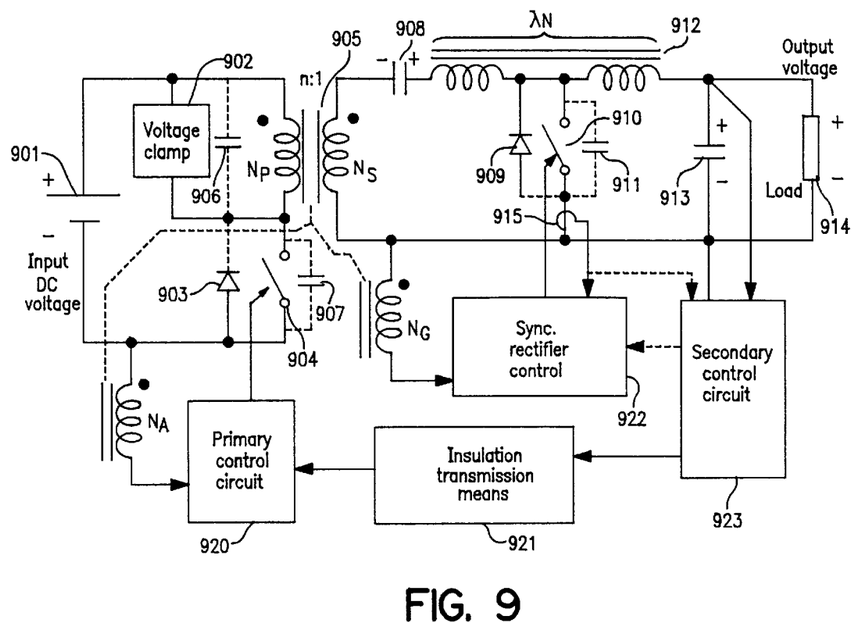
FIG. 9 is a circuit diagram of a variation of the circuit arrangement of FIG. 1 with a tapped inductor.

A circuit variation with tapped inductor is shown in FIG. 9. The output inductor is replaced by a tapped inductor (912) with a turns ratio of $\lambda$:1, where $\lambda N$ is the total number of turns of the whole tapped inductor and N is the number of turns of the untapped portion. The circuit operation is same as the circuit arrangement in FIG. 1.

The tapped inductor is effectively a transformer without isolation. It can be shown that the input-output voltage conversion ratio is $$V_O = \frac{V_{CC}}{\lambda \cdot n} \frac{D}{(1-D)}$$

and the flyback voltage across the coupling capacitor is equal to $V_O$.

The FFB converter with a tapped inductor offers a trade off of the leakage inductances of the transformer with the current stress of the synchronous rectifier. It can be shown that the voltage stress of the synchronous rectifier is equal to $V_O/D$. If the voltage stresses of both the primary switching means and the synchronous rectifier are fixed, then the duty cycle arid the product in the denominator ($\lambda \cdot n$) are known. As the leakage inductances of the transformer are almost directly proportional to the turns ratio n, they can be minimized by selecting a small value for n and a large value for $\lambda$. However, as the value of $\lambda$ increases, the current stress of the synchronous rectifier and the ripple current of the output capacitor also increase. Here, a trade off can be made between power loss due to leakage inductances of the transformer and the power loss in the synchronous rectifier and the output capacitor.

The leakage inductances of the tapped inductor may also cause power loss in the voltage clamp. But the coupling between the two windings of the tapped inductor can be easily maximized because no safety constraint is imposed on the construction of the tapped inductor.

For $\lambda > 1$, the secondary transformer current is reduced during on-period and increased during off-period when it is compared with the case with a single output inductor ($\lambda = 1$). However, the rms secondary transformer current is increased. In practice, the maximum value of $\lambda$ is limited below 2 in order to have gain in efficiency.

Figure 10:
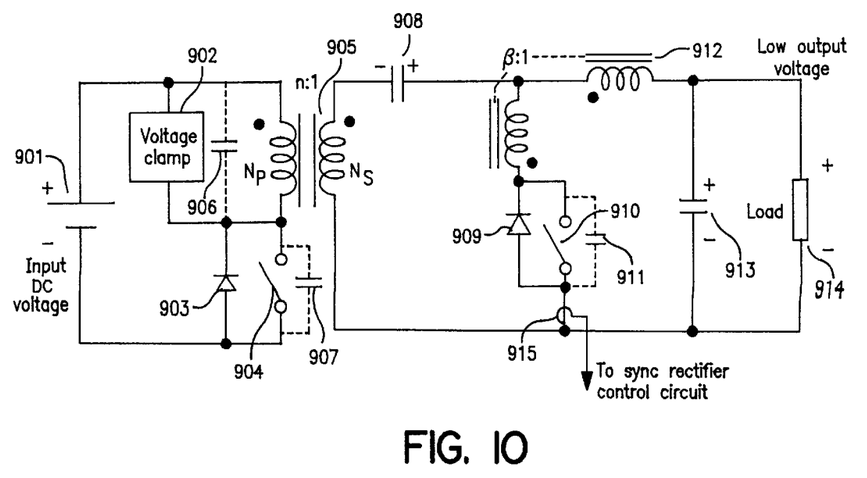
FIG. 10 is a special circuit arrangement of FIG. 9 that is suitable for low output voltage.

The case of $0 < \lambda < 1$ is shown in FIG. 10. It is very suitable for low output voltage (e.g. 3.3V) because the current of the synchronous rectifier is reduced by the tapped inductor, as well as its conduction loss. For a low-volt MOSFET, it is quite difficult to have a dramatic reduction of its on-resistance by decreasing its breakdown voltage. Practically, 12 to 20V is the lowest value of the breakdown voltage of present MOSFET devices. Therefore, with the special circuit arrangement in FIG. 10, the efficiency of the FFB converter can be improved for low output voltage.

In FIG. 10, the turns ratio between the two windings of the tapped inductor is $\beta:1$. The relationship between $\lambda$ and $\beta$ is $\lambda = 1/(\beta+1)$. The input-output voltage conversion ratio of the circuit arrangement in FIG. 10 is same as that in FIG. 9.

The tapped inductor is also applicable in the FFB converter with clamp switch (FIG. 6). It does not need to change the connection of the clamp switch as shown in FIG. 6.

An FFB converter with tapped transformer secondary windings has similar characteristic to that with tapped inductor. FIG. 11 shows its circuit arrangement. The current through the synchronous rectifier is returned to a new secondary winding $N_{S2}$, instead of the secondary ground. Its circuit operation is same as the basic circuit arrangement of resonant-transition switching FFB converter shown in FIG. 1.

It can be shown that the input-output voltage conversion ratio of the FFB converter with tapped transformer secondary windings is $$V_O = V_{CC} \frac{N_{S1} + N_{S2}}{N_P} \frac{D}{(1-D)}$$

where $N_{S1}$=number of turns of the first secondary winding
$N_{S2}$=number of turns of the second secondary winding
$N_P$=number of turns of the primary winding The term $(N_{S1}+N_{S2})/N_P$ in the above equation is equivalent to the term $1/(\lambda \cdot n)$ in the case of tapped inductor. The flyback voltage across the coupling capacitor is equal to the output voltage. The voltage stress of the synchronous rectifier is $V_O/D$.

For the polarities of the two secondary windings shown in FIG. 11, the voltage conversion ratio $V_O/V_{CC}$ increases with $N_{S2}$, provided that the duty cycle and the primary and the first secondary turns are fixed. If the polarity of the second secondary winding is reversed in FIG. 11, it is equivalent to connecting the synchronous rectifier to a tapped terminal along the first secondary winding, and its effect on the voltage conversion ratio will be opposite to the above.

The tapped transformer secondary windings are applicable in the FFB converter with clamp switch (FIG. 6). The clamp switch may be connected across either secondary winding or the two windings.

To trade off the leakage inductances of the transformer with the current stress of the synchronous rectifier, it is better to use the tapped inductor because of its simplicity in winding construction. It is also possible to apply both tapped inductor and tapped transformer secondary windings to the circuit arrangements in FIGS. 1 and 6.

The last circuit variation is the FFB converter with multiple outputs and coupled inductors is shown in FIG. 12. Although two outputs are shown, the principle may be extended to more than two outputs.

In FIG. 12, the secondary circuit arrangement attached to the first secondary winding $N_{S1}$ is same as FIG. 1. The second secondary winding $N_{S2}$ is stacked on $N_{S1}$ and an identical set of secondary circuit arrangement is connected to $N_{S2}$ to generate the second output $V_{O2}$. The two output inductors are wound on the same magnetic core to form coupled inductors (1212). The turns ratio of the coupled inductors conforms to the turns ratio of the transformer secondary windings. It can improve the cross regulation and reduce the size and cost of the output inductors.

The two output voltages are fed to the secondary control circuit for shared regulation. The circuit operation of the FFB converter with multiple outputs and coupled inductors is same as the circuit arrangement in FIG. 1. The second and third switching means (1218 and 1210 respectively) are turned on and off synchronously. Only one current sensor (1215) is needed for the synchronous rectifier control and the detection of a net reverse current flowing through the two synchronous rectifiers. It merely requires a reverse current flowing through the primary winding during resonant-transition switching period.

The cross regulation is further improved by the use of the two synchronous rectifiers because output energy is permitted to release back to the input by the reverse current flowing in the output inductors, the transformer and the second, and third switching means.

In some application where the main output ($V_{O1}$) supplies a high voltage to a load, the use of a synchronous rectifier regarding the reduction of conduction loss does not have significant advantage. The switch (1218) which enclosed in dotted rectangle, may be removed in FIG. 12. The second output ($V_{O2}$) provides a low voltage to a load. A single synchronous rectifier (1209 and 1210) may be used in the second output circuit in order to provide reverse current for resonant-transition switching. It is quite often that the main output carries the largest portion of total output power. Thus the secondary control circuit mainly regulates the main output. The above-mentioned circuit arrangement also improves the cross regulation between the two outputs under the condition that the main output is at full load and the second output is at no load or light load. The excessive energy which causes the second output voltage to increase at no load will be released to the main output by a reverse current flowing through the switch (1210), the second output winding ($N_{S2}$) and the coupled inductors (1212).

It will be appreciated the FFB converter may be readily modified with a clamp switch (FIG. 6) for multiple outputs and coupled inductors. Other circuit variations discussed above are applicable to FFB converters with multiple outputs and coupled inductors.

Embodiments of the invention can provide converters that improve the conversion efficiency and reduce the size and cost of such a switching power supply, in particular, a single-ended flyback converter. An FFB converter can be provided that stably operates at high frequency, with switching loss to be reduced and also switching noise to be decreased.

The FFB converters can operate with low-loss interruption of parasitic oscillation using a clamp switch, the range of switching frequency to be limited, the switching loss to be reduced and the switching noise to be decreased.

We claim:

1. A DC-to-DC converter comprising:

first and second input terminals for receiving a DC supply;

a power transformer having a primary winding and a secondary winding;

a first switch with an anti-parallel rectifier connected between the first input terminal of the converter and the primary winding of the power transformer;

first and second output terminals for supplying DC output signals to a load;

an output inductor connected to the first output terminal of the converter;

a coupling capacitor connected between the secondary winding of the power transformer and the output inductor;

a second switch with an anti-parallel rectifier connected across a junction between the coupling capacitor and the output inductor and the second output terminal of the converter, the second switch operating in alternation with the first switch for releasing energy stored in the coupling capacitor and/or the output inductor back to the secondary winding of the power transformer during an off-period of the first switch, whereby the energy stored in the coupling capacitor and/or the output inductor is applied to the secondary winding is released back to the primary winding of the the power transformer, and wherein the second switch is controlled by the output signals of the converter.

2. The DC-to-DC converter according to claim 1, wherein the secondary winding is electrically isolated from the primary winding and the coupling capacitor is connected to the secondary winding.

3. The DC-to-DC converter according to claim 2, including a voltage clamp circuit connected across the primary winding.

4. The DC-to-DC converter according to claim 1, including a current sensor circuit for measuring current flowing in the second switch and supplying signals to the control circuit.

5. The DC-to-DC converter according to claim 1, wherein each of the first and second switches comprises a MOSFET, and the anti-parallel rectifiers of the first and second switches each comprise a body diode of the MOSFET.

6. The DC-to-DC converter according to claim 1, including a clamp switch comprising a third switch and a rectifier connected across output terminals of the power transformer, the clamp switch being turned on and off in alternation with the second switch when the first switch is turned off.

7. The DC-to-DC converter according to claim 1, wherein the output inductor is tapped, and the second switch with an anti-parallel rectifier is connected between a junction of the output inductor and one of the first and second output terminals of the converter.

8. The DC-to-DC converter according to claim 1, wherein the secondary winding of the power transformer is tapped, and the second switch with an anti-parallel rectifier is connected across the junction between the coupling capacitor and the output inductor and the secondary winding of the power transformer.

9. A DC-to-DC converter comprising:

first and second input terminals for receiving a DC supply;

a power transformer having a primary winding and a secondary winding;

a first switch with an anti-parallel rectifier connected between the first input terminal of the converter and the primary winding of the power transformer;

first and second output terminals for supplying DC output signals to a load;

an output inductor connected to a first output terminal of the inverter;

a coupling capacitor connected between the secondary winding of the power transformer and the output inductor; and a second switch with an anti-parallel rectifier connected across a junction between the coupling capacitor and the output inductor and the second output terminal of the converter, wherein the coupling capacitor has a dominant capacitive reactance (Xc dominant) and low loss (high Q factor) characteristics.

10. The DC-to-DC converter according to claim 1, including a clamp switch connected across the output inductor.

11. A DC-to-DC converter comprising:

first and second input terminals for receiving power from a DC supply;

a power transformer having a primary winding and a secondary winding;

a first switch with an anti-parallel rectifier connected between the first input terminal of the converter and the primary winding of the power transformer;

output terminals for supplying DC output signals to a load;

an output inductor connected to a first output terminal of the converter;

a coupling capacitor connected between the secondary winding of the power transformer and the output inductor;

a third output terminal for providing a low output voltage;

a second inductor electrically coupled to the third output terminal and magnetically coupled to the output inductor for delivering the low output voltage to the load; and a synchronous rectifier connected to the second inductor to provide reverse current for resonant-transition switching of the first switch.

12. The DC-to-DC converter according to claim 1, including a first auxiliary inductor connected across the secondary winding, wherein the energy stored in the coupling capacitor and/or the output inductor is released to the auxiliary inductor.

13. The DC-to-DC converter according to claim 12, including a second auxiliary inductor connected across the primary winding wherein energy stored in the coupling capacitor and/or output inductor is released to the second auxiliary inductor.

14. The DC-to-DC converter according to claim 13 wherein the energy stored in the coupling capacitor is released to the first and second auxiliary inductors.

15. The DC-to-DC converter of claim 9 wherein energy stored in the coupling capacitor is applied to the secondary winding and thereby released to the primary winding.

16. The DC-to-DC converter of claim 11 wherein energy stored in the coupling capacitor is applied to the secondary winding and thereby released to the primary winding.

17. The DC-to-DC converter of claim 1 comprising:

a primary control circuit coupled to the first switch for controlling ON and OFF periods of the first switch;

a auxiliary winding coupled to the second input terminal of the converter and the primary control circuit for producing a signal for turning the first switch ON;

insulation transmission means coupled to the primary control circuit for controlling the ON period of the first switch; and a secondary control circuit coupled to the first and second output terminals of the converter and the insulation transmission means for regulating output voltage by outputting error signals to the insulation transmission means to adjust the ON period of the first switch.

18. The DC-to-DC converter of claim 9 comprising:

a primary control circuit coupled to the first switch for controlling ON and OFF periods of the first switch;

a auxiliary winding coupled to the second input terminal of the converter and the primary control circuit for producing a signal for turning the first switch ON;

insulation transmission means coupled to the primary control circuit for controlling the ON period of the first switch; and a secondary control circuit coupled to the first and second output terminals of the converter and the insulation transmission means for regulating output voltage by outputting error signals to the insulation transmission means to adjust the ON period of the first switch.

* * * * *